April 30, 1968  E. H. WRENCH ET AL  3,380,687
SATELLITE SPIN DISPENSER
Filed June 11, 1965  3 Sheets-Sheet 1
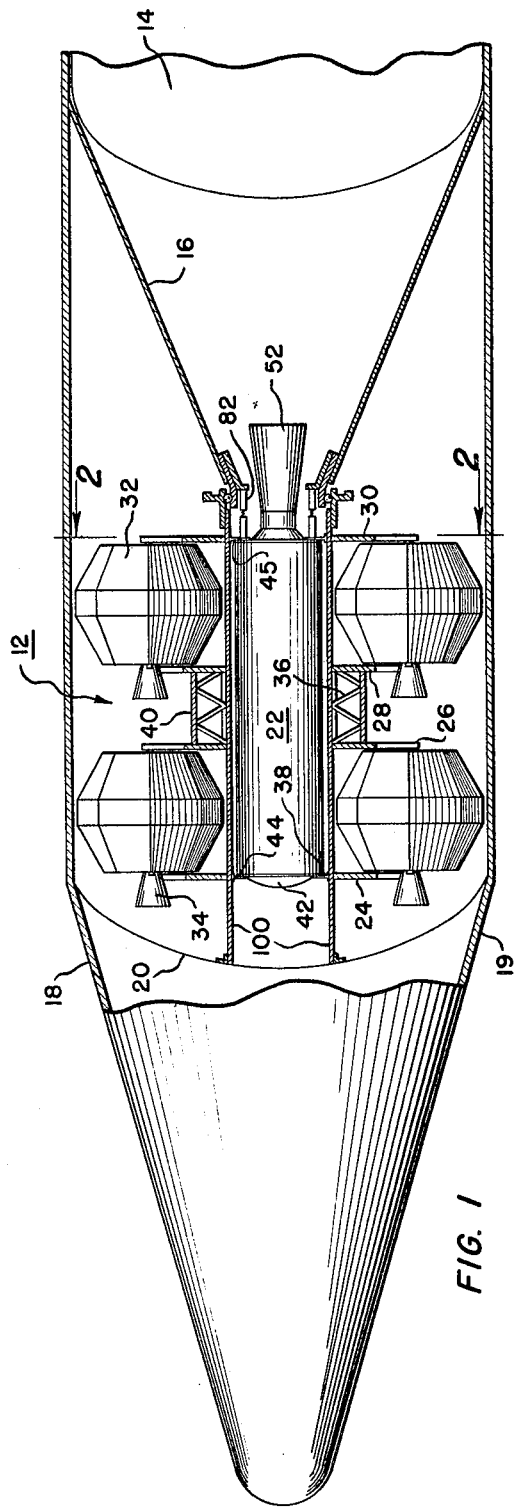
FIG. 1
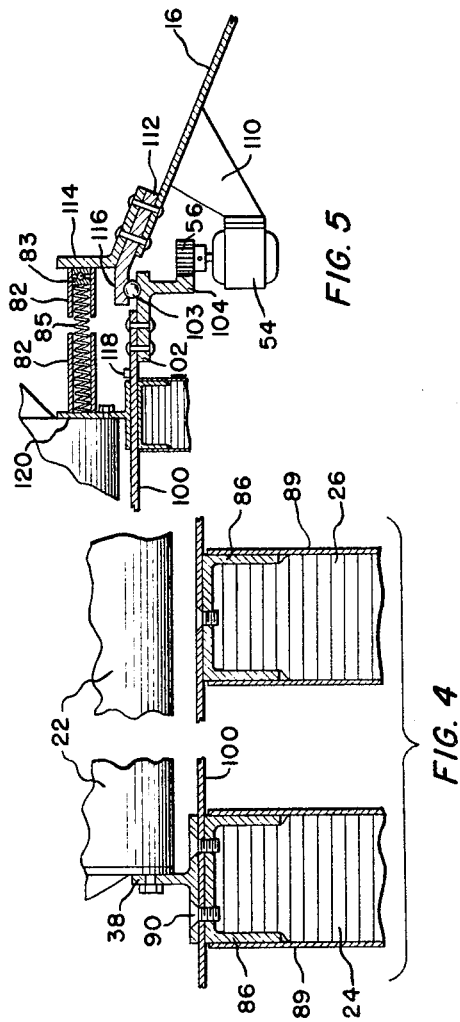
FIG. 5
FIG. 4
EDWIN H. WRENCH
ERIK C. LINDKVIST
BARRY A. MENDOZA
ROBERT A. CLOSE
WILLIAM E. GIBB
JOHN FORD
INVENTORS
BY Earl F. Kotts
ATTORNEY April 30, 1968   E. H. WRENCH ET AL   3,380,687
SATELLITE SPIN DISPENSER
Filed June 11, 1965   3 Sheets-Sheet 2

EDWIN H. WRENCH
ERIK C. LINDKVIST
BARRY A. MENDOZA
ROBERT A. CLOSE
WILLIAM E. GIBB
JOHN FORD
INVENTORS

BY Earl F. Kotts
ATTORNEY

April 30, 1968

E. H. WRENCH ET AL 3,380,687

SATELLITE SPIN DISPENSER

Filed June 11, 1965

EDWIN H. WRENCH
ERIK C. LINDKVIST
BARRY A. MENDOZA
ROBERT A. CLOSE
WILLIAM E. GIBB
JOHN FORD
INVENTORS

BY Earl F. Kotts

ATTORNEY

United States Patent Office 3,380,687
Patented Apr. 30, 1968

3,380,687
SATELLITE SPIN DISPENSER
Edwin H. Wrench and Erik C. Lindkvist, La Jolla, Barry A. Mendoza, La Mesa, Robert A. Close, La Jolla, William E. Gibb, Solana Beach, and John Ford, San Diego, Calif., assignors to General Dynamics Corporation, San Diego, Calif., a corporation of Delaware
Filed June 11, 1965, Ser. No. 463,163
13 Claims. (Cl. 244—1)

ABSTRACT OF THE DISCLOSURE

An apparatus for spinning and dispensing satellites in orbit. The dispenser, enclosed in a heat shield atop a non-spinning space booster, is rotated by a drive mechanism within the shield prior to being released. After release, the spinning dispenser releases one or more of its satellites by ground command. The satellites are connected to the dispenser by spaced pairs of connectors. As one connection is released upon command, the satellite pivots about its other connection as a result of centrifugal force until reaching a pre-determined angular position, whereupon it is automatically released into orbit.

---

This invention relates to a satellite spin dispenser and more particularly to a satellite spin dispenser that carries a plurality of satellites and dispenses the satellites in desired orbits. The dispenser has a spinning motion that is used to impart rotational movement to individual ones of the satellites upon their release from the dispenser.

In the past, to place a satellite in space it has been necessary to expend a very expensive and non-recoverable booster vehicle such as the Atlas missile or the like. More recently, it has been found possible to deploy more than one satellite at a time into space by carrying the additional satellites piggy-back on other space payloads and then dispense the additional satellites at appropriate intervals. Still more recently it has become necessary to deploy a plurality of satellites into particularly positioned orbits while only using a single space booster.

The prior art devices for dispensing a plurality of articles may be categorized as being devices that place the dispenser or the like in a pre-spinning condition with the dispenser releasing the articles in clusters that move away from the carrier by centrifugal force. The speed of movement corresponds to the rate of spin speed of the dispenser. Unfortunately, these devices do not have sufficient control of the spin rate of the article deployed to be effective in deploying satellites because it is required that the satellites not only be deployed in a correct orbit but also be spinning at that established spin speed for obtaining stability in orbit. If the rate of spin of the satellite is too slow, then the satellite may become unstable in its orbit. If the rate of spin or rotation of the satellite is too fast, then the structural strength of the satellite has to be increased thus increasing weight and cost of the satellite.

Further, if the satellite is to be deployed at a fast rate of spin, then of course the carrier must be rotated at the same speed. This requires that the carrier have considerable strength and size and a large mechanism must be placed on the booster to rotate the heavy carrier at the desired speed. While some solid fuel rockets and boosters are spun at lift-off to obtain the inherent stability required, it is difficult to control this rate of spin and often this rate of spin is not the same as is required for good satellite spin stability. Liquid fuel space boosters that are presently used because of their more easily established control parameters, do not utilize spin stability. Thus it may be understood that where liquid fuel space boosters are used to boost satellite dispensers into space, a considerable structural strength and weight problem arises in providing for spinning at a rapid rate of speed, a dispenser that may be 10 feet in diameter.

Therefore, it is an object of this invention to provide an improved and novel satellite spin dispenser.

It is another object of this invention to provide an improved and novel satellite spin dispenser that utilizes the angular momentum of the dispenser to impart rotational movement to the satellites upon release.

It is another object of this invention to provide an improved and novel satellite spin dispenser that is simple in construction, light weight in construction, and yet reliable in operation.

It is another object of this invention to provide an improved and novel satellite spin dispenser wherein a plurality of satellites may be dispensed with selective spinning speeds.

It is another object of this invention to provide a satellite spin dispenser that dispenses a plurality of satellites with rotational speeds different from the speed of rotation of the dispenser.

It is another object of this invention to provide an improved and novel release mechanism.

This invention concerns a dispensing apparatus for selectively dispensing satellites individually in space with a rate of spin greater than or less than the rate of spin of the dispensing apparatus. In the specific embodiment of the invention, the dispensing apparatus may carry several satellites and selectively dispense them into given positions in space. The embodiment is positioned on the top of a space booster and has its own propulsion unit. In flight to the dispensing position, the apparatus is spun relative to the non-spinning space booster and prior to release therefrom by a spinning mechanism. Upon release, the spinning dispenser apparatus is then propelled to a given orbiting position by its propulsion booster. Upon a given ground command, individual ones or, if desired, clusters of the satellites carried by the apparatus are selectively released. The size of the dispenser may be large; on the order of 10 feet in diameter. Accordingly, it is not generally feasible to spin the large dispenser apparatus at that speed at which it is desirable to have the individual satellites spinning in their orbit. Thus the individual satellites are each secured to the dispenser apparatus by a two point spaced connection. At the desired release time, one side of the satellite is released allowing the one side of the satellite to be moved away from the spinning device by centrifugal force. This swinging out rotational movement of the satellite causes the satellite not only to move away from the dispenser but to be rotated itself at a speed greater than that of the dispenser. The other side of the satellite is pivotally held by a unique pivot release mechanism which release mechanism releases the satellite after a predetermined rotational movement of the satellite.

The pivot release mechanism of this invention has a release pin that is resiliently biased to a retracted position upon release. The release pin holds the individual satellites to the dispenser. As the individual satellite rotates with the release of a first side at some angle of rotation, for example 45 degrees of rotation, the pivotal shaft will retract thereby releasing the satellite with a spin rotation as well as a linear radial velocity. The pivot release mechanism will not retract until the satellite has rotated through a predetermined angle which angle may be set prior to lifting the satellites and dispenser into space.

Thus it may be seen that this invention produces a simple, light weight, yet effective, reliable, and controllable mechanism for deploying satellites with a desired spin speed. Other objects, and many of the intended advantages of this invention, will be readily appreciated as the same becomes better understood by reference to the following detailed description when considered in connection with the accompanying drawings wherein:

FIGURE 1 is a plan view, partially in section, of the spin dispenser and satellites of this invention.

FIGURE 4 is a cross-sectional view of the manner of connecting the yoke to the propulsion unit 22.

FIGURE 5 is a view more in detail of the particular structure of the attachment of the dispenser apparatus to the space booster structure.

Figure 2:
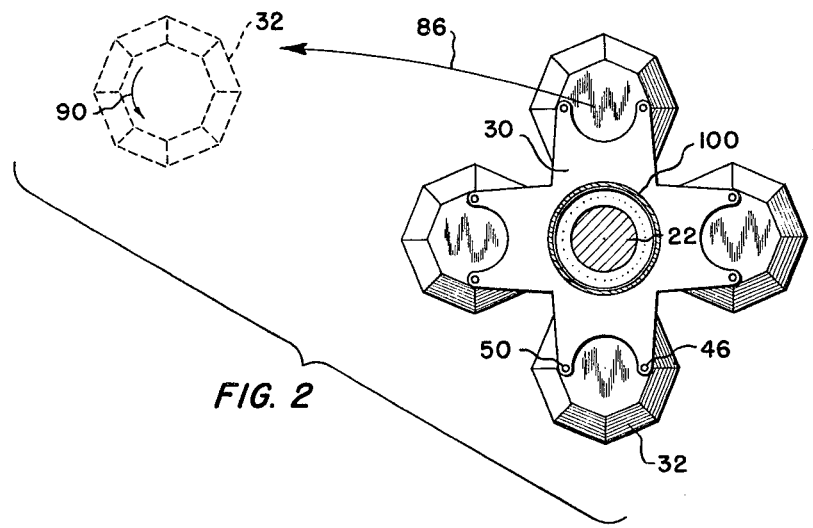
FIGURE 2 is a view taken along line 2—2 of FIGURE 1.
Figure 3:
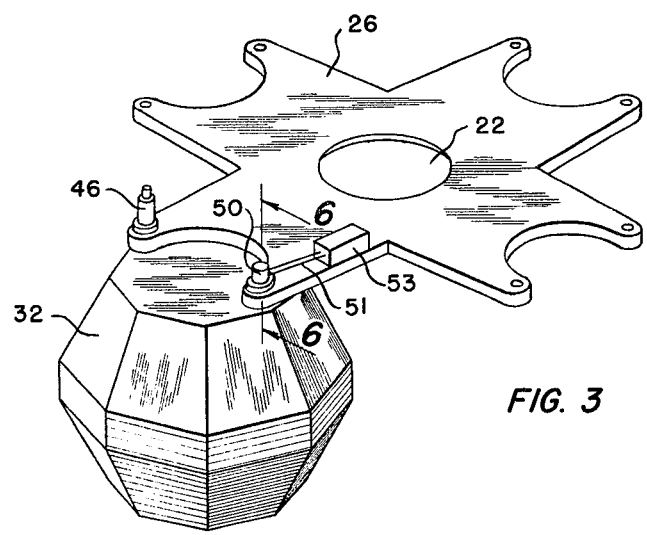
FIGURE 3 is a perspective view of a part of the invention that illustrates the mechanism for securing the spin dispenser yoke panels to the satellites.

Referring now to FIGURE 1, there is shown a satellite spin dispenser apparatus 12 that is mounted on a space booster 14 through a conical mating structure 16. The purpose of booster 14 is to lift the satellite spin dispenser 12 into space. Since the whole structure must travel at a very high rate of speed through the earth's atmosphere, heat shields 18 and 19, that are well known in the art, along with shield 20, are provided to protect the dispenser and the satellites from the heat generated by air friction.

The conical support member 16 is made of strong but relatively light sheet metal. A ring member 114 is secured to the narrowed portion of the conical member 16 (see FIGURE 5) where there is attached a ring member 114 with one portion 112 of the bearing race secured therebetween. Both members, 112 and 114, increase the strength of the conical member against inward movement. The bearing is held on the other side by bearing race 103 that is integral with ring member 102 that is secured by rivets, bolts, or the like to cylindrical member 100. Cylindrical member 100 is the main central structural support for the dispenser apparatus. Also integral with the bearing race 103 is a ring gear 104 that cooperates with driving gear 56. Driving gear 56 is rotated by an electric motor 54 that is secured by plate 110 to the outer surface of the conical member 16.

A shaped charge 118 that may be electrically exploded at an appropriate time from a ground control unit is provided for parting the satellite spin dispenser structure from the booster structure as will be more apparent hereinafter. Spring housing 82 are positioned between plates 114 and 120. A plurality of springs 85 are compressed therebetween with bearings 83 allowing rotational movement of plates 114, 120, and other structure connected thereto. In this rotational movement, the spin satellite is supported by bearings 103. The plurality of springs 85 that are around the circumference of the structure are not disturbed by the relative movements of ring flanges 120 and 114 because of bearings 83.

The cylindrical member 100 forms the center core structural member of the satellite spin dispenser. A plurality of honeycomb rib or yoke members 24, 26, 28, and 30 are secured to the cylinder 100 (see FIGURE 4) and form the ribs for holding the satellites and the propulsion unit in an integral whole. As may be seen, the cylindrical member 100 extends through the yoke members 24 through 30 with members 24 and 30 (see FIGURE 2) fitting around and against the opposite ends of the propulsion unit 22. The propulsion unit 22 is secured to the side of honeycomb support yokes 24 and 30 by mounts 44 and 45.

Positioned midway of the dispenser apparatus and secured to the outer surface of cylindrical member 100 are center honeycomb rib members 26 and 28. Referring now to FIGURE 4, rib members 26 and 28 are secured to cylindrical member 100 by means of the U-shaped ring 86 bonded to the core 26 and to outer panel surfaces 89.

The satellites 32 may be of any shape or construction. Preferably they will have a symmetrical shape and will contain instruments and the like. Each satellite has its own propulsion unit 34 for positioning the individual satellite in its given orbital position. The satellites are secured between the respective honeycomb members 24, 26, 28, and 30 in the manner shown. Each of the ends of the yokes have apertures therethrough for receiving the pivotal release mechanism 46 and the explosive release pin 50, both of which will be described in detail hereinafter that secure each of the satellites from radial movement outward. A truss structure 36 fits between the honeycomb members 26 and 28 to provide structural strength and rigidity.

Figure 6:
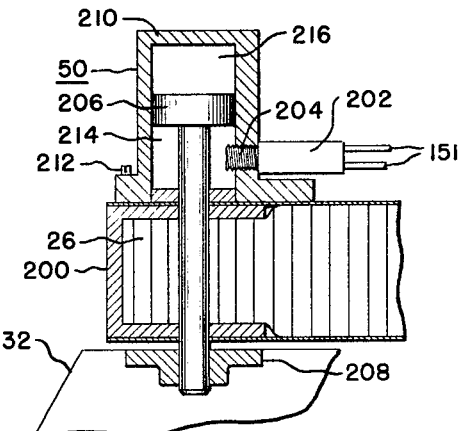
FIGURE 6 is a cross-sectional view taken along line 6—6 of FIGURE 3.
Figure 7:
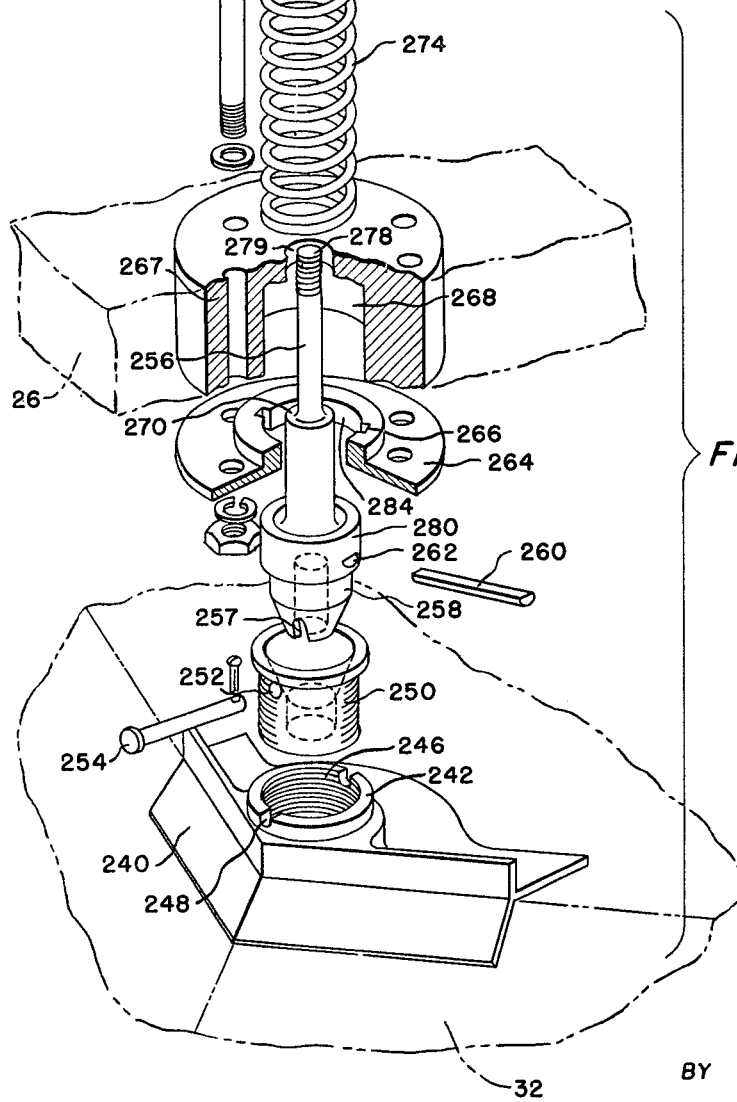
FIGURE 7 is an exploded view of the pivot release mechanism of this invention.

Referring now to FIGURE 6 there is shown the explosive release pin 50 having a bolt that passes through an outer flange member 200 of the honeycomb yoke and into engaging plate 208 on the satellite 32. A cap 210 fits over the head or piston end 206 of the bolt and forms a pair of cavities 214 and 216. Cap member 210 is secured to the honeycomb member 200 by bolts or the like 212. Inserted into the side of cap 50 under piston 206 and in communication with volume 214 is an explosive charge member 204 having an electrical connector 202 connected to lines 151 for carrying the electrical firing signal. Upon applying appropriate signals from a ground station to controller box 53, an electrical charge is passed through lines 151 to ignite the charge 204 causing explosive gases to enter volume 214. This expanding force on piston 206 moves the bolt upwardly out of the cavity in fitting 208 of satellite 32. This releases this side of the satellite 32 from the honeycomb yoke member 26.

The other side of the satellite 32 is held by pivotal relase mechanism 46. The mechanism is positioned in the honeycomb yoke 26 and is releasably secured to the satellite structure 32. Secured to satellite 32 is a plate 240 having a threaded recess 246 for receiving the fitting 250. The threaded socket 246 has aligned apertures 248 across the diameter thereof for receiving lock pin 254. Pin 254 is inserted through apertures 252 of cone fitting 250. Pin 254 functions to lock the cone fitting in a given position in the satellite attached fitting 240 and also functions to mate with the slot 257 of plunger 258 that is inserted into fitting 250 and mates with the fitting's conical inner surface.

Fitted into honeycomb yoke member 26 is a ring member 267 that has a counter bore 268 and an opening 279. Ring member 267 may be secured to the honeycomb panel 26 in any of several well known methods. A ring plate 264 is secured by bolts to ring plate 267, and the end 278 of plunger member 256 projects through aperture 279. A spring is held onto the end 256 of the plunger between ring member 267 and end 278 by threaded nut 276. As may be seen, spring 274 abuts against the upper surface of ring member 267 and resiliently biases plunger member 256 in an upward direction. When the plunger is in the upper or raised position, shoulder 270 abuts against the end of counter bore 268.

A collar 280 fits on to the cone end 258 of the pin or plunger 356 and has an aperture 262 for receiving shaft pin 260. Shaft pin 260, when inserted through aperture 262 in collar 280 has its ends projecting beyond the outer surface thereof a distance slightly less than the depth of slots 266 in ring member 264. Thus when pin 260 is aligned with slots 266, then the plunger member 256 is able to be drawn upward by spring 274.

Figure 8:
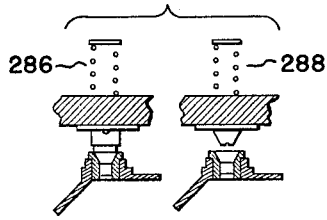
FIGURE 8 is a schematic of the spin pivot release mechanism of this invention illustrating the mechanism in cocked and released conditions.

In operation of the pivot release mechanism, the slot 257 is aligned with lock pin 254. Thus rotational movement of the pin or plunger is restricted. In this position, shaft pin 260 is out of alignment with slots 266. Upon rotational movement of satellite 32, pin 254 rotates with the satellite thereby rotating plunger 256 to a point that pin 260 is aligned with slots 266. When this alignment occurs, spring member 274 draws the plunger upward and away from the cone fitting 250 thereby releasing the satellite 32 for lateral movement. These two positions are illustrated in FIGURE 8 with 286 illustrating the cocked or held positions and 288 illustrating the released position.

In operation of the satellite dispenser apparatus, a space booster 14 having the apparatus positioned thereon is launched into space. After passing through the atmosphere, heat shields 18 and 19 part and are pulled away exposing the satellite spin dispenser to the rarified atmosphere and later to space. At a given point in the flight, motor 54 is energized by appropriate controls from ground transmitting stations and rotates gear 56 that in turn meshes with ring gear 104 turning the spin dispenser mechanism at the desired speed. Later at a predetermined position in the flight the shape charge 118 is fired. This parts cylinder member 100 from the space booster 14. Springs 82 push the satellite spin dispenser away from the booster 14. At this point, the satellite dispenser is in its own separate flight path and is spinning. Propulsion unit 22 is then ignited and propels the dispenser on the rest of its flight to the position where the satellites 32 are to be released.

At an appropriate position in the flight path of the dispenser, an appropriate signal from a ground transmitting station transmits a signal to box 53. This initiates an electrical firing current to the explosive release bolt member 50. The bolts, 50, on each end of the satellite are automatically released allowing the satellite to move under centrifugal force radially outward in the direction 86 shown in FIGURE 2. When the satellite has rotated outwardly about 45 degrees, then pin 260 of the pivot release mechanism 46 aligns with slots 266. This allows the spring 274 to draw the plunger 256 away from its holding position against the satellite 32 and satellite 32 moves out into space as shown in phantom in FIGURE 2 with an appropriate linear radial force away from the dispenser and with a spinning motion 90.

It should be understood that the linear speed of the satellite away from the dispenser may be predetermined by setting the speed at which motor 56 spins the dispenser and the angle of release of release mechanisms 46. Further, the spin speed of the satellite 32 may also be predetermined by the appropriate angular setting of pin 260 relative to the aperture 266. It being understood that the larger the rotational movement of satellite 32 around the pivot release mechanism 46 before a complete radial position is reached, the greater the spin and linear speed imparted.

Obviously many modifications and variations of the present invention are possible in the light of the above teachings. It is therefore to be understood that within the scope of the appended claims, the invention may be practiced otherwise than as is specifically described.

What is claimed as new and desired to be secured by Letters Patent is:

1. A spin dispenser comprising,
dispenser means for carrying a cluster of articles,
means for rotating said dispenser means,
holding means for holding said articles from being moved radially outward from said dispenser means by centrifugal force, said holding means securing each of said articles to said dispenser means at spaced connection points,
and said holding means having release means operable to disengage one of said spaced connection points for releasing said articles with induced linear movement and rotational movement in said released articles.

2. A spin dispenser comprising,
dispenser means for carrying a cluster of articles,
means for rotating said dispenser means,
holding means for holding said articles from being moved radially outward from said dispenser means by centrifugal force, said holding means securing each of said articles to said dispenser means at spaced connection points,
and said holding means having means operable to disengage one of said spaced connection points for releasing said articles in a manner that said released articles have a linear movement and a rotation speed greater than the rotational speed of said dispenser means.

3. A satellite spin dispenser for dispensing satellites in space comprising,
dispenser means for carrying a cluster of satellites,
means for rotating said dispenser means,
holding means for holding said satellites from being moved radially outward from said dispenser means by centrifugal force, said holding means securing each of said satellites to said dispenser means at spaced connection points,
and said holding means having release means selectively operable to disengage one of said spaced connection points for releasing said satellites and imparting rotational movement to said satellites in response to rotation of said dispenser means.

4. A satellite spin dispenser for dispensing satellites in space comprising,
dispenser means for carrying at least a satellite,
means for rotating said dispenser means,
holding means for holding said satellite from being moved radially outward by centrifugal force,
said holding means having a plurality of release means for releasing said satellite and imparting rotational movement to said satellite,
and one of said release means being operable upon a given amount of rotation of said satellite.

5. A satellite spin dispenser for dispensing satellites in space comprising,
dispenser means for carrying a cluster of satellites,
holding means for holding said satellites from being moved radially outward by centrifugal force,
said holding means having a pair of individual release means for releasing each of said satellites,
one of said release means being operable to release one portion of said satellite allowing said satellite to pivot around the other of said release means,
the other of said release means being capable of releasing said satellite from said dispenser upon a given amount of pivotal movement of said satellite solely in response to said centrifugal force.

6. A satellite spin dispenser for dispensing satellites in space comprising,
dispenser means for carrying at least one satellite,
holding means for holding said satellite from being moved radially outward by centrifugal force,
said holding means having a pair of individual release means for releasing said satellite,
one of said release means being operable to release one side of said satellite allowing said side of said satellite to pivot around the other of said release means,
the other of said release means comprising a pivot release device for releasably holding said dispenser and satellite in alignment and against lateral movement while allowing rotational movement therebetween,
and said pivot release device releasing said satellite from said dispenser upon a given amount of pivotal movement of said satellite.

7. A satellite spin dispenser for dispensing satellites in space comprising,
dispenser means for carrying at least one satellite,
holding means for holding said satellite from being moved radially outward by centrifugal force, said holding means having a pair of individual release means for releasing said satellite, one of said release means being operable to release one side of said satellite allowing said side of said satellite to pivot around the other of said release means, the other of said release means comprising a socket and a plunger member that are joined to releasably hold said dispenser means and said satellite in alignment and against lateral movement while allowing rotational movement therebetween, and means for pulling said plunger from said socket in response to given rotational movement between said dispenser and said satellite.

8. A satellite spin dispenser comprising, dispenser means for carrying a cluster of satellites, means for rotating said dispenser means, holding means for holding each of said satellites from being moved radially outward by centrifugal force, said holding means having a plurality of releasing means for releasing said satellites, ones of said releasing means being capable of releasing ones of said holding means, the remainder of said releasing means being capable after operation of said ones of said releasing means of releasing the remainder of said holding means releasing said satellites from said dispenser and imparting rotational movement to said satellites, each of said ones of said releasing means being selectively operable, and each of said others of said releasing means being automatically operable to release said satellites upon a given rotational movement of said satellites.

9. A pivot release device for releasably holding two members in alignment and against lateral movement while allowing rotational movement therebetween comprising, a socket fixed to one member, a plunger member having a tapered end for removably fitting in said socket, lock means for locking said plunger member against rotational movement in said socket, said plunger member projecting through an opening in said other member, means for exerting pulling force tending to pull said plunger member through said opening and out of said socket, the portion of said plunger member between said two members having a pin projecting therethrough at a substantially normal angle to said plunger member, plate means fixed to said other member for opposing movement of said pin toward said opening, and said plate means having a slot therethrough for passing said pin upon given rotational movement between said members.

10. A pivot release device for releasably holding two members in alignment and against lateral movement while allowing rotational movement therebetween comprising, a socket fixed to one member having a slot therethrough, a plunger member having a tapered end for removably fitting in said socket, a locking pin for fitting in said slot in said socket and locking said plunger member against rotational movement in said socket, said plunger member projecting through an opening in said other member, resilient means for pulling said plunger member through said opening and out of said socket, the portion of said plunger member between said two members having a pin projecting therethrough at a substantially normal angle to said plunger member, plate means non-rotationally fixed to said other member for opposing movement of said pin toward said opening, said plate means having a slot therethrough for passing said pin, and upon rotational movement between said members said pin moving into said slot allowing said resilient means to pull said plunger member out of said socket releasing said members.

11. A satellite spin dispenser comprising, dispenser means for carrying a cluster of satellites which satellites are distributed longitudinally and circumferentially around the perifery thereof, booster means for boosting said dispenser means into space, means on said booster for rotating said dispenser means, said dispenser means having a frame with a plurality of radially projecting yoke members for supporting said satellites, each end of said satellites having at least a pair of holding means spaced from the axis of said satellite for securing each side of said satellite to the projections of said yoke members, said holding means having a plurality of releasing means for individually releasing each of said satellites therefrom, ones of said releasing means being selectively capable of releasing ones of said holding means holding the one side of said satellites and allowing said satellite to rotate in a radial direction away from said yoke members and around the others of said pair of holding means, and others of said releasing means being capable after a given amount of said radial rotation of releasing said others of said holding means and releasing said satellites from said dispenser means allowing centrifugal force to impart free rotational movement to each of said released satellites.

12. A satellite spin dispenser comprising, dispenser meas for carrying a cluster of satellites which satellites are distributed longitudinally and circumferentially around the perifery thereof, booster means for boosting said dispenser means into space, means on said booster for rotating said dispenser means, said dispenser means having a frame for supporting said satellites, each end of said satellites having at least a pair of holding means spaced from the axis of said satellite for securing each side of said satellite to said frame and from being moved radially outward from said frame by centrifugal force, said holding means having a plurality of releasing means for individually releasing each of said satellites therefrom, ones of said releasing means being selectively capable of releasing ones of said holding means holding the one side of said satellites and allowing said satellite to rotate in a radial direction away from said dispenser and around the others of said pair of holding means, others of said releasing means being capable after a given amount of said radial rotation of releasing said others of said holding means and releasing said satellites from said dispenser means allowing said centrifugal force to impart free rotational movement to each of said released satellites, means for releasing said dispenser from said booster, propelling means for propelling said dispenser, and each of said satellites having a separate booster.

13. A satellite spin dispenser comprising, dispenser means for carrying a cluster of satellites which satellites are distributed longitudinally and circumferentially around the periphery thereof, booster means for boosting said dispenser means into space, means on said booster for rotating said dispenser means, said dispenser means having a frame for supporting said satellites, each end of said satellites having at least a pair of holding means spaced from the axis of said satellite for securing each side of said satellite to said frame and from being moved radially outward from said frame by centrifugal force, said holding means having a plurality of releasing means for individually releasing each of said satellites therefrom, ones of said releasing means being selectively capable of releasing ones of said holding means holding the one side of said satellites and allowing said satellite to rotate in a radial direction away from said dispenser and around the others of said pair of holding means, others of said releasing means being capable after a given amount of said radial rotation of releasing said others of said holding means and releasing said satellites from said dispenser means allowing said centrifugal force to impart free rotational movement to each of said released satellites, said others of said releasing means including socket means fixed to said satellites, plunger means having tapered ends for removably fitting in said socket means, lock means for locking said plunger means against rotational movement in said socket means, said plunger means projecting through openings in said frame, means for exerting pulling force tending to pull portions of said plunger means through said openings and out of said socket means, the portion of said plunger means between said satellite and said frame having pin means projecting therethrough at a substantially normal angle to said plunger means, plate means on said satellites for opposing movement of said pin means toward said opening means, and said plate means having slots therethrough for passing said pin means upon given rotational movement between said satellites and said frame.

References Cited

UNITED STATES PATENTS

| | | | |
|---|---|---|---|
| 1,496,466 | 6/1924 | Jackson | 16—171 |
| 2,264,906 | 12/1941 | Roby | 102—5 |
| 2,500,299 | 3/1950 | Spitzkeit | 287—103 |
| 2,671,682 | 3/1954 | Page | 287—103 |
| 3,093,072 | 6/1963 | Pigman | 102—7.2 |

FERGUS S. MIDDLETON, *Primary Examiner.*